(12) United States Patent
Kim

(10) Patent No.: US 6,230,224 B1
(45) Date of Patent: May 8, 2001

(54) FAN-OUT EXPANSION CIRCUIT FOR RS-485 MULTIDROP CONNECTION

(75) Inventor: Jin-Wook Kim, Kumi-shi (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/174,909

(22) Filed: Oct. 19, 1998

(30) Foreign Application Priority Data

Mar. 5, 1998 (KR) .................................................. 98-7284

(51) Int. Cl.[7] .................................................. G06F 13/14
(52) U.S. Cl. ................ 710/128; 340/825.52; 340/825.53
(58) Field of Search .................... 710/128, 106; 340/825.52, 825.53

(56) References Cited

U.S. PATENT DOCUMENTS

| | | |
|---|---|---|
| 4,882,702 | 11/1989 | Struger et al. . |
| 4,947,386 | 8/1990 | Preschutti . |
| 5,014,236 | 5/1991 | Pogorzelski et al. . |
| 5,060,134 | 10/1991 | Hunninghaus . |
| 5,305,215 | 4/1994 | Brekkestran et al. . |
| 5,390,038 | * 2/1995 | Cecchini ............................. 359/113 |
| 5,408,228 | * 4/1995 | Wnendt et al. .................. 340/825.52 |
| 5,455,700 | 10/1995 | Thompson et al. . |
| 5,603,051 | 2/1997 | Ezzet . |
| 5,673,258 | 9/1997 | Helbig et al. . |
| 5,684,966 | 11/1997 | Gafford et al. . |

(List continued on next page.)

OTHER PUBLICATIONS

MEV Limited.; *Isolated RS485 Repeater: Instruction Manual* (1994);wysiwyg://91http://www.mev–ltd.demon.co.uk/repman.htm.

*The DIFAR44 RS485 Repeater* and schematic diagrams; by R.E. Smith; www.rs485.com/pdifar44.html.
*Quick Reference For RS485, RS 422, and RS232 and RS423*; by Ron Smith; www.rs485.com/rs485spec.html.
Quatech; *QTM–8520R RS–485 to RS–232 Converter Module with RS–485 Site Isolation*; www.quatech.com/shopquatech/products/prod4243.asp.
Quatech; *QTM–8510 RS–485 Isolated Repeater Module*; www.quatech.com/shopquatech/prod...d533.asp!shop=off&placard=2000101111755.
Paper by Jan Stanek discussing the RS–422 and RS–485 in comparison with RS–232; www.hw.cz/english/docs/rs485/rs485.html.
*RPT–RS485 Physical Repeater RS485 Technical Description*; by SysMik GmbH Dresden; www.sysmik.de/data_htm/e_repeater_rs485.html.
*RS–422/485 Repeaters RA–48*; www.westermo.se/products/ra–48.html.
*Adam–4510/4510S/4520/4522*; General/Isolated RS–422.485 Repeater Isolated/General RS–232 to 422/485 Converter; www.advantech.com.

Primary Examiner—Thomas Lee
Assistant Examiner—Abdelmoniem Elamin
(74) Attorney, Agent, or Firm—Robert E. Bushnell, Esq.

(57) ABSTRACT

A fan-out expansion circuit for an RS-485 multidrop connection includes: a master node, a plurality of line control units, and a plurality of slave nodes. The master node communicates with the slave nodes by a polling technique using an identification number of the slave node. The line control units control the transmitting/receiving direction of data upon communication between the master node and the slave nodes. Each of the line control units has one side connected to the master node via a first RS-485 common line and has another side connected to the slave nodes via a second RS-485 common line. A maximum of 32 line control units can be connected to the master node. A maximum of 32 slave nodes can be connected to each of the line control units.

13 Claims, 3 Drawing Sheets

U.S. PATENT DOCUMENTS

| | | | |
|---|---|---|---|
| 5,710,755 | * | 1/1998 | Chen .................................. 370/294 |
| 5,802,327 | | 9/1998 | Hawley et al. . |
| 5,805,833 | | 9/1998 | Verdun . |
| 5,875,310 | * | 2/1999 | Buckland et al. .................. 710/126 |
| 5,996,038 | * | 11/1999 | Looi et al. ......................... 710/129 |
| 6,070,214 | * | 5/2000 | Ahern ................................ 710/128 |

* cited by examiner

FAN-OUT EXPANSION CIRCUIT FOR RS-485 MULTIDROP CONNECTION

CLAIM OF PRIORITY

This application makes reference to, incorporates the same herein, and claims all benefits accruing under 35 U.S.C. §119 from an application for FAN-OUT EXPANSION CIRCUIT FOR RS-485 MULTIDROP CONNECTION earlier filed in the Korean Industrial Property Office on Mar. 5, 1998 and there duly assigned Ser. No. 7284/1998.

BACKGROUND OF THE INVENTION

1. Field of the Invention

The present invention relates to an RS-485 interface, and more particularly, to a circuit for connecting one master node to a large number of slave nodes in a communication network management system.

2. Description of the Related Art

An RS-485 interface is a 2-wire differential drive transmission system. When a supervisory control system of a communication network (or transmission network) is designed using an RS-485 interface, a multidrop connection circuit having a master node and slave nodes is widely used. In communication between the master node and the slave nodes, there is used a polling technique by the master node using a unique identification (ID) number. In an earlier RS-485 multidrop connection circuit, the number (fan-out) of slave nodes which can be connected to one RS-485 common line is 32. The master node sequentially transmits/receives request and response data with the 32 slave nodes.

The master node and the slave nodes transmit/receive data by setting an enable signal to a logic "HIGH (1)" or logic "LOW (0)". One master node is connected to 32 slave nodes at a maximum through an RS-485 common line. The master node has a driver and a receiver. Each of the slave nodes also has a receiver and a driver. The communication between the master node and the slave nodes is done on the basis of the master node. In more detail, the master node sets an enable signal to a logic "LOW" level and transmits data by using an ID number of a slave node which it is to communicate with. If the data has been transmitted, the master node sets the enable signal to a logic "HIGH" level to maintain its drive at a high impedance state. The respective slave nodes receive the data from the master node. A slave node receiving request data corresponding to its own ID number sets its enable signal to a logic "LOW" level and transmits response data to the master node. If the response data has been transmitted, the corresponding slave node sets its enable signal to a logic "HIGH" level to maintain its drive at a high impedance state. Thus the master node sequentially communicates with all of the slave nodes.

However, since the earlier RS-485 multidrop connection circuit has a maximum of 32 slave nodes connected to one RS-485 common line, it is impossible to construct a supervisory control network consisting of hundreds or thousands of nodes. Therefore, it is necessary to expand the fan-out.

The following patents each discloses features in common with the present invention: U.S. Pat. No. 5,305,215 to Brekkestran et al., entitled Expandable, Mobile, Modular Microcomputer System For AN Off-Road Vehicle, U.S. Pat. No. 4,882,702 to Struger et al., entitled Programmable Controller With I/O Expansion Module Located In One Of I/O Module Positions For Communication With Outside I/O Modules, U.S. Pat. No. 5,060,134 to Hunninghaus, entitled Action Direction Port Expansion Circuit And System, U.S. Pat. No. 5,014,236 to Pogorzelski et al., entitled Input/Output Bus Expansion Interface, U.S. Pat. No. 5,802,327 to Hawley et al., entitled Device For SCSI Expansion, U.S. Pat. No. 5,805,833 to Verdun, entitled Method And Apparatus For Replicating Peripheral Device Ports IN AN Expansion Unit, U.S. Pat. No. 5,603,051 to Ezzet, entitled Input/Output Processor With A Local Memory providing Shared Resources For A Plurality Of Input/Output Interfaces On AN I/O Bus, U.S. Pat. No. 5,684,966 to Gafford et al., entitled Method For Operating A Repeater For Distributed Arbitration Digital Data Buses, U.S. Pat. No. 4,947,386 to Preschutti, entitled Fixed Gain Fixed Loss Amplification System, U.S. Pat. No. 5,455,700 to Thompson et al., entitled Regenerative Communication Channel Extender, and U.S. Pat. No. 5,673,258 to Helbig et al., entitled Method And Apparatus For The Enlargement Of The Reach Of The Transmission Channel Between Functional Groups Of ANISDN-User Interface.

SUMMARY OF THE INVENTION

It is an object of the present invention to provide a fan-out expansion circuit for a 1:N (hundreds or thousands of nodes) multidrop connection between a master node and slave nodes in designing a centralized communication network management system using RS-485.

To achieve the above and other objects of the present invention, there is provided a fan-out expansion circuit including a master node, a plurality of line control units, and a plurality of slave nodes. The master node communicates with the respective slave nodes by a polling technique using an identification number of the slave node. The line control units control the transmitting/receiving direction of data upon communication between the master node and the slave nodes. Each of the line control units has one side connected to the master node via a first RS-485 common line and has another side connected to each of the slave nodes via a second RS-485 common line. A maximum of 32 line control units can be connected to the master node. A maximum of 32 slave nodes can be connected to each of the line control units.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
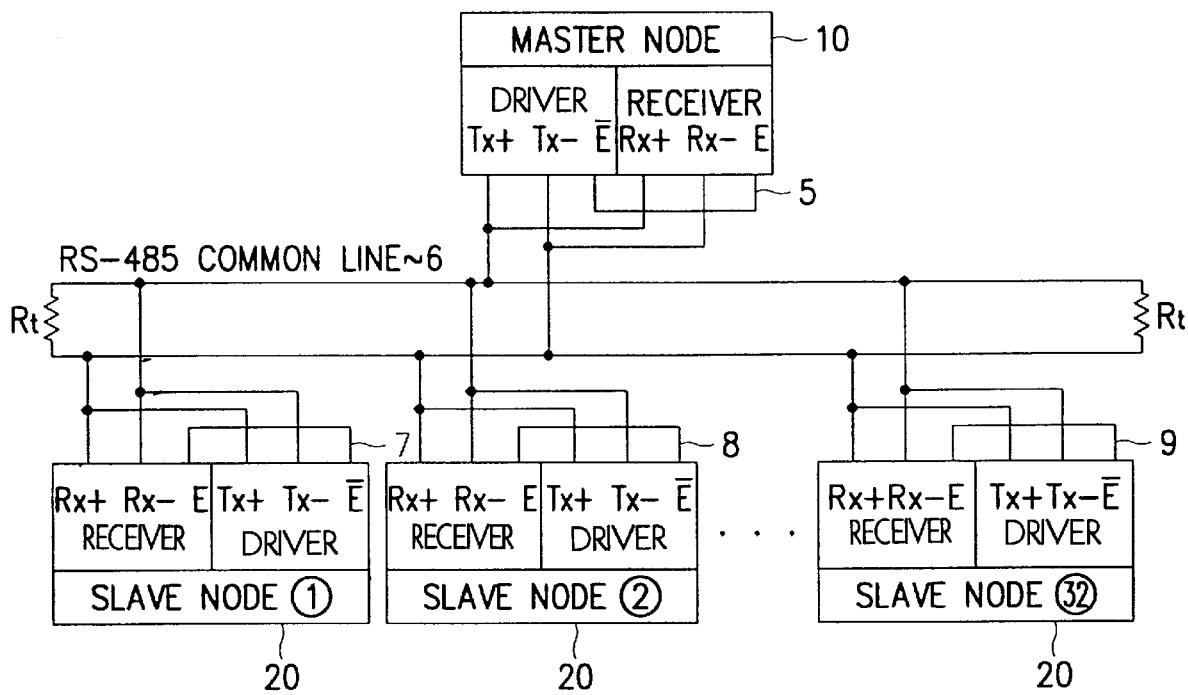
FIG. 1 shows an earlier RS-485 multidrop connection circuit.

FIG. 1 shows an earlier RS-485 multidrop connection circuit as discussed in detail in the Description of the Related Art.

One master node 10 is connected to 32 slave nodes 20 through an RS-485 common line 6. The master node 10 has a driver and a receiver as well as each of the slave nodes 20.

Each of the drivers has a Tx+ and Tx− and E whereas each of the receivers has a Rx+ and Rx− and $\overline{\text{E}}$. The master node 10 sets an enable signal 5 to a logic low level and transmits data by using an ID number of a slave node which it is to communicate with. If the data has been transmitted, the master node 10 sets the enable signal to a logic high level to maintain its drive at a high impedance state. The respective slave nodes 20 receive the data from the master node 10 and a slave node receiving request data corresponding to its own ID number sets its enable signal 7, 8, or 9 to a logic low level and transmits response data to the master node 10. If the response data has been transmitted, the corresponding slave node sets its enable signal to a logic high level to maintain its drive at a high impedance state. Thus, the master slave 10 sequentially communicates with all of the slave nodes 20.

A fan-out expansion circuit for 1:N (hundreds or thousands of nodes) multidrop connection between a master node and slave nodes needed in designing a centralized transmission network management system using an RS-485 interface will now be described with reference to FIGS. 2 and 3.

Figure 2:
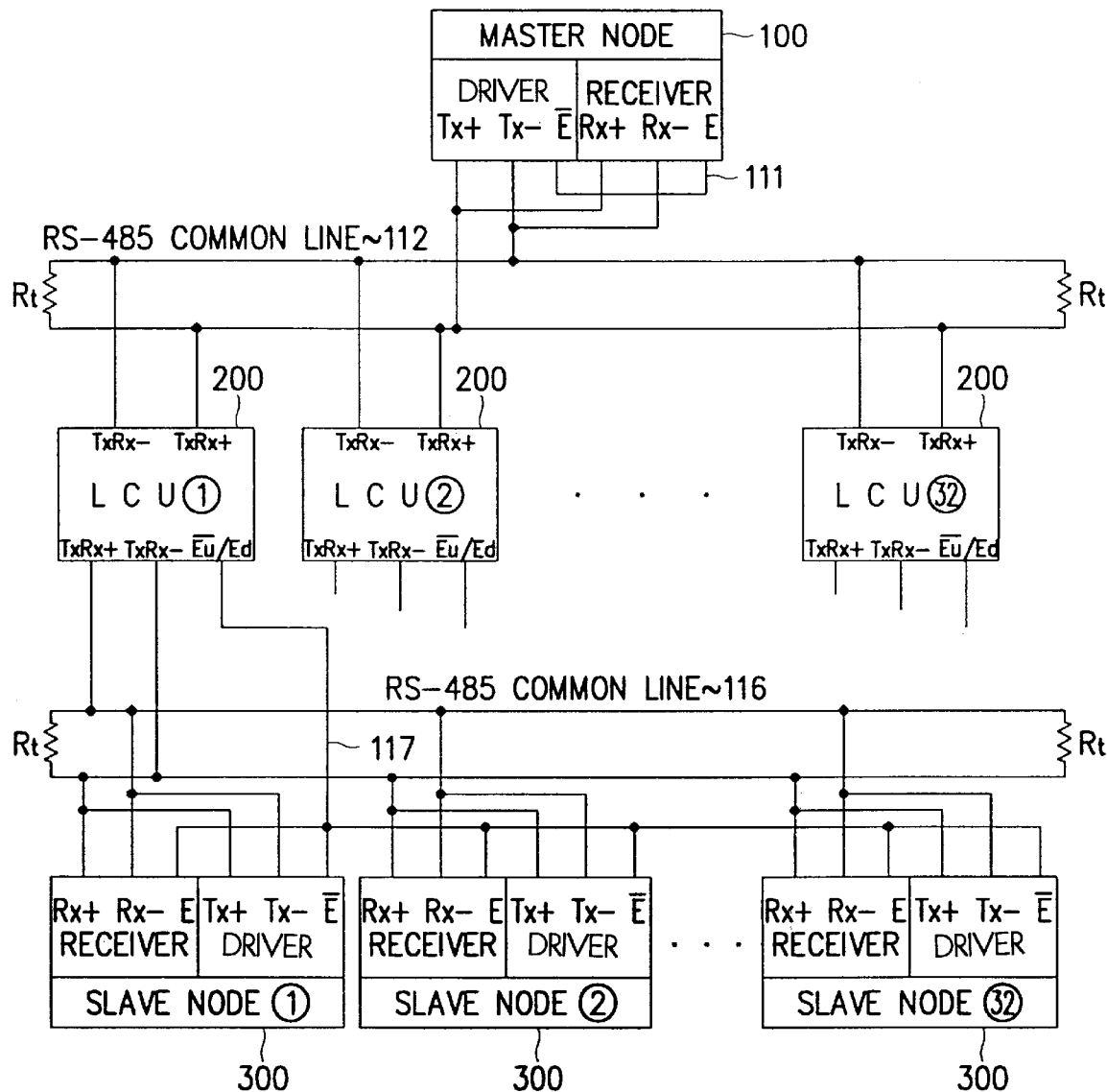
FIG 2 shows a fan-out expansion circuit for an RS-485 multidrop connection according to a preferred embodiment the present invention.

Referring to FIG. 2, one master node 100 is connected to a maximum of 1024 slave nodes 300 (that is, the fan-out is 1024.). A communication path from the master node 100 is as follows: master node 100→RS-485 common line 112→line control unit (LCU) 200→RS-485 common line 116→32 slave nodes 300. Such a communication path is expanded up to 32 paths. That is, one RS-485 common line 112 is connected to a maximum of 32 LCUs 200 each being connected to a maximum of 32 slave nodes 300 via the RS-485 common line 116. As a result, the maximum number of slave nodes 300 connected to one master node 100 is 1024. The internal circuit construction of each of the LCUs 200 is illustrated in FIG. 3.

Figure 3:
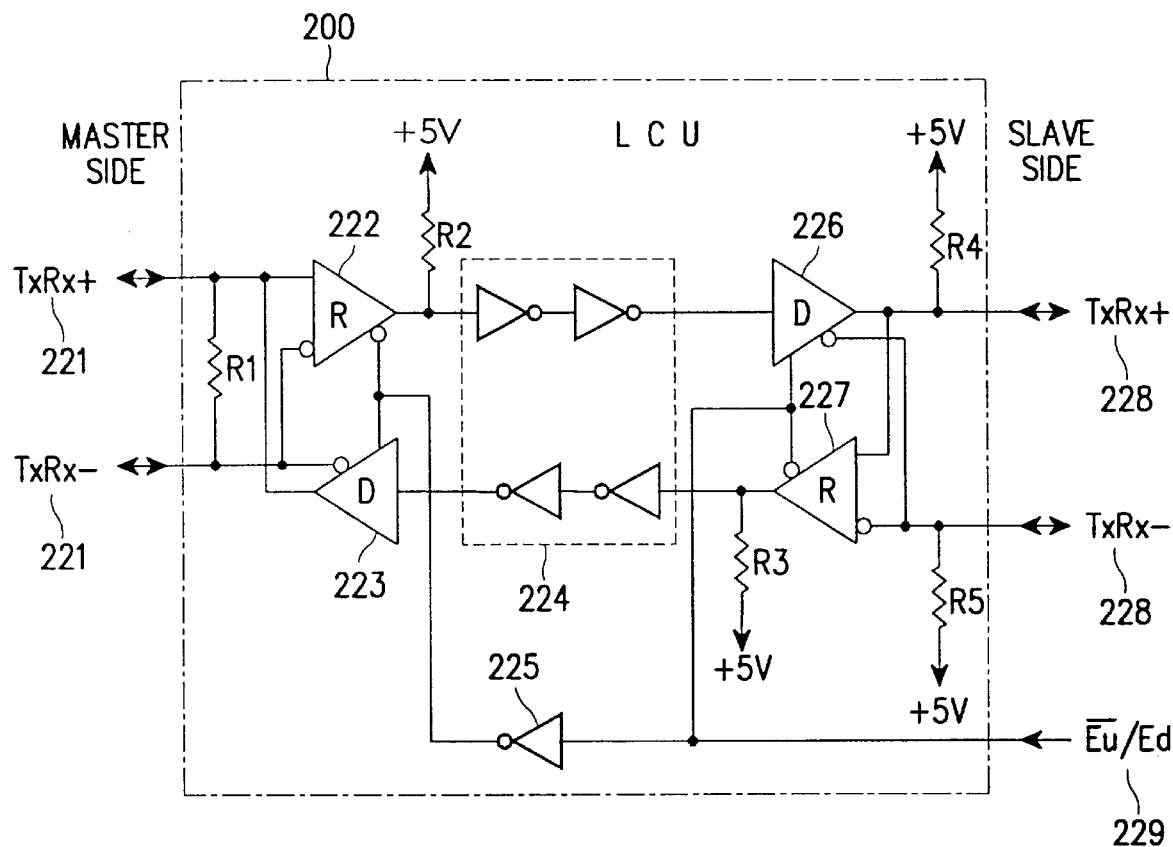
FIG. 3 is a detailed circuit diagram of a line control unit shown in FIG. 2.

Referring to FIG. 3, the LCU 200 includes a master side circuit and a slave side circuit. The master side circuit has transmitting/receiving connection lines (TxRx+/TxRx−) 221, a termination resistor R1, an RS-485 receiver 222, and an RS-485 drive 223. The slave side circuit has an RS-485 drive 226, an RS-485 receiver 227, termination resistors R4 and R5, and transmitting/receiving connection lines (TxRx+/TxRx−) 228. The LCU 200 further includes a signal restoring circuit consisting of resistors R2 and R3 and a circuit 224 and includes a transmitting/receiving direction control circuit consisting of a line 229 and an inverter 225. The signal restoring circuit maintains a data signal transmitted/received from the transmitting/receiving connection lines 221 and 228 and restores the data signal. The transmitting/receiving direction control circuit controls the transmitting/receiving direction of the data signal. The connection lines 221 of the master side circuit and the connection lines 228 of the slave side circuit are constructed such that communication can be effected by only two lines. The termination resistors of the master side and slave side circuits are used for line impedance matching.

In a communication between the master node 100 and slave nodes 300, there is used a polling technique by the master node 100 using a unique ID number. The master node 100 sequentially transmits and receives request and response data with the slave nodes 300. The master node 100 and the slave nodes 300 transmit/receive data by setting enable signals 111 and 117 set to a logic "HIGH" or "LOW" level.

The communication between the master node 100 and the slave nodes 300 is done on the basis of the master node 100. The master node 100 sets the enable signal 111 to a logic "LOW" level and transmits data by using an ID number of a slave node which is to communicate. If the data has been transmitted, the master node 100 sets the enable signal 111 to a logic "HIGH" level to maintain its drive at a high impedance state. The slave node receives the data while maintaining the enable signal 117 at a logic "HIGH" level. A slave node receiving request data corresponding to its own ID number sets the enable signal 117 to a logic "LOW" level and transmits response data to the master node 100. If the response data has been transmitted, the corresponding slave node sets the enable signal 117 to a logic "HIGH"level to maintain its drive at a high impedance state. The transmitting/receiving direction between the master node 100 and the slave node is controlled by the transmitting/receiving direction control circuit (225 and 229). Namely when data is transmitted from the master node 100 to the slave nodes 300, the $\overline{\text{Eu}}$/Ed line 229 is maintained at a logic "HIGH" level to activate the receiver 222 and the driver 226. When data is transmitted from the slave nodes 300 to the master node 100, the $\overline{\text{Eu}}$/Ed line 229 is maintained at a logic "LOW" level to activate the receiver 227 and the driver 223. Thus the master node 100 sequentially communicates with all of the slave nodes 300.

As described above, in constituting the supervisory control system of the transmission network using an RS-485 interface, hundreds or thousands of slave nodes can be connected to the master node by using the line control units. Therefore, the supervisory control system of the transmission network can be easily designed at a low cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A fan-out expansion circuit for an RS-485 multidrop connection, comprising:

a master node for communicating with each of a plurality of slave nodes by a polling technique using an identification number of each of said slave nodes;

a plurality of line control units for controlling the transmitting/receiving direction of data upon communication between said master node and said plurality of slave nodes, each of said line control units having one side connected to said master node via a first RS-485 common line and having another side connected to said plurality of slave node via a second RS-485 common line, a maximum of 32 line control units being connected to said master node; and a plurality of slave nodes being connected to said another side of each of said line control units via said second RS-485 common line, a maximum of 32 slave nodes being connected to each of said line control units, each of said line control units comprising:

a master side RS-485 receiver and a master side RS-485 driver connected to said first RS-485 common line;

a slave side RS-485 receiver and a slave side RS-485 driver connected to said second RS-485 common line; and a signal restoring circuit having a first series coupled pair of inverters connected between said master side RS-485 receiver and said slave side RS-485 driver, and a second series coupled pair of inverters connected between said slave side RS-485 receiver and said master side RS-485 driver, a first resistor coupled between a positive voltage source and an output of said master side RS-485 receiver and a second resistor coupled between said positive voltage source and an output of said slave side RS-485 receiver.

2. A fan-out expansion circuit as claimed in claim 1, said master node being connected to a maximum of 1024 slave nodes.

3. A fan-out expansion circuit as claimed in claim 1, each of said line control units further comprising:

a first termination resistor commonly connected between said master side RS-485 receiver and said master side RS-485 driver;

a second termination resistor connected between a positive voltage source and said slave side RS-485 receiver;

a third termination resistor connected between positive voltage source said slave side RS-485 driver; and a direction control circuit for controlling the transmitting/receiving direction of said data signal.

4. A fan-out expansion circuit as claimed in claim 3, said direction control circuit controlling said direction by applying an enable signal to said slave side RS-485 receiver and said slave side RS-485 driver and applying said enable signal through an inverter to said master side RS-485 receiver and a master side RS-485 driver.

5. A fan-out expansion circuit as claimed in claim 3, said master node being connected to a maximum of 1024 slave nodes.

6. A fan-out expansion circuit as claimed in claim 4, said master node being connected to a maximum of 1024 slave nodes.

7. A fan-out expansion circuit for an RS-485 multidrop connection having a master node for communicating with each of a plurality of slave nodes by a polling technique using an identification number of each of said slave nodes, said fain-out expansion circuit comprising:

a plurality of line control units for controlling the transmitting/receiving direction of data upon communication between said master node and said plurality of slave nodes, each of said line control units comprising:

a master side RS-485 receiver and a master side RS-485 driver connected to said master node via a first RS-485 common line;

a slave side RS-485 receiver and a slave side RS-485 driver connected to each of said slave nodes via a second RS-485 common line; and a signal restoring circuit having a first series coupled pair of inverters connected between said master side RS-485 receiver and said slave side RS-485 driver, and a second series coupled pair of inverters connected between said slave side RS-485 receiver and said master side RS-485 driver, a first resistor coupled between a positive voltage source and an output of said master side RS-485 receiver and a second resistor coupled between said positive voltage source and an output of said slave side RS-485 receiver; and a direction control circuit for controlling the transmitting/receiving direction of said data signal.

8. A fan-out expansion circuit as claimed in claim 7, said direction control circuit controlling said direction by applying an enable signal to said slave side RS-485 receiver and said slave side RS-485 driver and applying said enable signal through an inverter to said master side RS-485 receiver and a master side RS-485 driver.

9. A fan-out expansion circuit as claimed in claim 7, each of said line control units further comprising:

a first termination resistor commonly connected between said master side RS-485 receiver and said master side RS-485 driver;

a second termination resistor connected between a positive voltage source and said slave side RS-485 receiver; and a third termination resistor connected between positive voltage source said slave side RS-485 driver.

10. A fan-out expansion circuit as claimed in claim 7, each of said line control units connecting said master node to a maximum of 32 slave nodes.

11. A fan-out expansion circuit as claimed in claim 8, each of said line control units connecting said master node to a maximum of 32 slave nodes.

12. A fan-out expansion circuit as claimed in claim 9, each of said line control units connecting said master node to a maximum of 32 slave nodes.

13. A fan-out expansion circuit as claimed in claim 9, wherein said plurality of line control units consists of a maximum 32 line control units and each of said line control units connects said master node to a maximum of 32 slave nodes.

* * * * *